(12) United States Patent
Abrams et al.

(10) Patent No.: US 11,423,317 B2
(45) Date of Patent: Aug. 23, 2022

(54) MODELING CHARACTERS THAT INTERACT WITH USERS AS PART OF A CHARACTER-AS-A-SERVICE IMPLEMENTATION

(71) Applicant: DISNEY ENTERPRISES, INC., Burbank, CA (US)

(72) Inventors: Michael Abrams, Los Angeles, CA (US); Eric Haseltine, Rancho Palos Verdes, CA (US)

(73) Assignee: Disney Enterprises, Inc., Burbank, CA (US)

( * ) Notice: Subject to any disclaimer, the term of this patent is extended or adjusted under 35 U.S.C. 154(b) by 596 days.

(21) Appl. No.: 15/373,352

(22) Filed: Dec. 8, 2016

(65) Prior Publication Data

US 2018/0165596 A1 Jun. 14, 2018

(51) Int. Cl.
| | | |
|---|---|---|
| *G06N 5/04* | (2006.01) | |
| *G06N 20/00* | (2019.01) | |
| *G06N 3/06* | (2006.01) | |
| *G06N 3/00* | (2006.01) | |

(52) U.S. Cl.
CPC .............. *G06N 5/04* (2013.01); *G06N 3/006* (2013.01); *G06N 20/00* (2019.01)

(58) Field of Classification Search
CPC ........ G06N 20/00; G06N 3/006; G06N 7/005; G06N 5/04; G06F 17/30
See application file for complete search history.

(56) References Cited

U.S. PATENT DOCUMENTS

| | | | |
|---|---|---|---|
| 6,463,585 | B1 | 10/2002 | Hendricks et al. |
| 7,146,627 | B1 | 12/2006 | Ismail et al. |
| 8,171,509 | B1 | 5/2012 | Girouard et al. |
| 9,038,107 | B2 | 5/2015 | Khoo et al. |
| 9,602,884 | B1 | 3/2017 | Eldering et al. |

(Continued)

OTHER PUBLICATIONS

Antonella Santangelo, "A Virtual Shopper Customer Assistant in Pervasive Environment" pp. 447-456 (Year: 2007).*

(Continued)

*Primary Examiner* — Ann J Lo
*Assistant Examiner* — Van C Mang
(74) *Attorney, Agent, or Firm* — Artegis Law Group, LLP

(57) ABSTRACT

In one embodiment, a character engine models a character that interacts with users. The character engine receives user input data from a user device, and analyzes the user input data to determine a user intent and an assessment domain. Subsequently, the character engine selects inference algorithm(s) that include machine learning capabilities based on the intent and the assessment domain. The character engine computes a response to the user input data based on the selected inference algorithm(s) and a set of personality characteristics that are associated with the character. Finally, the character engine causes the user device to output the response to the user. In this fashion, the character engine includes sensing functionality, thinking and learning functionality, and expressing functionality. By aggregating advanced sensing techniques, inference algorithms, character-specific personality characteristics, and expressing algorithms, the character engine provides a realistic illusion that users are interacting with the character.

19 Claims, 5 Drawing Sheets

(56) References Cited

U.S. PATENT DOCUMENTS

| | | | |
|---|---|---|---|
| 9,785,684 | B2 * | 10/2017 | Allen .................. G06F 16/2477 |
| 10,078,917 | B1 | 9/2018 | Gaeta et al. |
| 10,357,881 | B2 * | 7/2019 | Faridi .................. B25J 11/0015 |
| 2007/0094041 | A1 | 4/2007 | Coale et al. |
| 2010/0306655 | A1 | 12/2010 | Mattingly et al. |
| 2012/0127284 | A1 | 5/2012 | Bar-Zeev et al. |
| 2014/0007157 | A1 | 1/2014 | Harrison et al. |
| 2014/0143806 | A1 | 5/2014 | Steinberg |
| 2014/0279050 | A1 * | 9/2014 | Makar .................. G06F 16/9535 705/14.66 |
| 2015/0032766 | A1 | 1/2015 | Greenbaum |
| 2015/0095277 | A1 * | 4/2015 | Tristan .................. G06N 7/005 706/52 |
| 2015/0113570 | A1 | 4/2015 | Klarfeld et al. |
| 2015/0302639 | A1 | 10/2015 | Malekian et al. |
| 2015/0328550 | A1 * | 11/2015 | Herzig .................. A63F 13/30 463/31 |
| 2016/0378861 | A1 * | 12/2016 | Eledath .............. G06K 9/00718 707/766 |
| 2017/0076498 | A1 | 3/2017 | Dakss et al. |
| 2017/0344532 | A1 * | 11/2017 | Zhou .................. G06F 40/56 |
| 2018/0052885 | A1 * | 2/2018 | Gaskill .................. G06N 5/022 |
| 2018/0150749 | A1 * | 5/2018 | Wu .................. G06F 16/9535 |
| 2018/0165596 | A1 | 6/2018 | Abrams et al. |
| 2019/0174172 | A1 | 6/2019 | Eubanks |
| 2019/0230387 | A1 | 7/2019 | Gersten |
| 2021/0006870 | A1 | 1/2021 | Navin et al. |
| 2021/0076106 | A1 | 3/2021 | Marten |

OTHER PUBLICATIONS

Yu Wu, "Automatic Chatbot Knowledge Acquisition from Online Forum via Rough Set and Ensemble Learning", IEEE, 2008 (Year: 2008).*

Anne-Gwenn Bosser, "Dialogs Taking into Account Experience, Emotions and Personality", AMC, 2007 (Year: 2007).*

Non-Final Office Action received for U.S. Appl. No. 16/049,745 dated Jun. 28, 2019, 19 pages.

Final Office Action received for U.S. Appl. No. 16/049,745 dated Jan. 10, 2020, 22 pages.

Non-Final Office Action received for U.S. Appl. No. 16/049,745 dated Jun. 26, 2020, 22 pages.

Final Office Action received for U.S. Appl. No. 16/049,745 dated Jan. 8, 2021, 22 pages.

Non-Final Office Action received for U.S. Appl. No. 16/853,451 dated Mar. 4, 2021, 11 pages.

Advisory Action received for U.S. Appl. No. 16/049,745, dated Apr. 10, 2020, 7 pages.

Advisory Action received for U.S. Appl. No. 16/049,745, dated Mar. 30, 2021, 5 pages.

Final Office Action received for U.S. Appl. No. 16/853,451 dated Aug. 19, 2021, 19 pages.

Non Final Office Action received for U.S. Appl. No. 16/853,451 dated Dec. 8, 2021, 10 pages.

Final Office Action received for U.S. Appl. No. 16/853,451 dated Mar. 17, 2022, 19 pages.

* cited by examiner

MODELING CHARACTERS THAT INTERACT WITH USERS AS PART OF A CHARACTER-AS-A-SERVICE IMPLEMENTATION

BACKGROUND OF THE INVENTION

Field of the Invention

Embodiments of the present invention relate generally to computer processing and, more specifically, to modeling characters that interact with users as part of a character-as-a-service implementation.

Description of the Related Art

Interacting with large numbers of users (e.g., customers, guests, clients, etc.) is an essential part of many services. For instance, an entertainment service provider oftentimes interacts with thousands or millions of individual users via help call lines, sales call lines, and/or entertainment characters. Some service providers employ human operators to interact with the users. However, as the number of user interactions increases, the costs associated with employing human operators to interact with the users becomes prohibitively expensive. For this reason, many service providers leverage touch-tone menus or simple menu voice recognition systems to automate interactions between remote users and various mass-market services, such as technical support, reservations, billing, and the like. Similarly, some entertainment service providers generate predetermined recordings to automate interactions between children and animation characters.

However, while interacting with these types of automated systems, users are typically aware that they are interacting with an automated system. For example, when the responses of an animated character are predetermined, many children quickly ascertain that they are not interacting with the "real" character. Consequently, users experience these automated systems as machines, not as characters that listen, observe, think and adapt responses to the particular needs and desires of individual users. As referred to herein, a character may be any entity that is associated with an individualizing personality. A character may be a live person, a historical person, a fictitious superhero, an animal, and so forth. When users perceive that they are interacting with an automated system instead of a character, the emotional quality (e.g., depth, richness, etc.) and enjoyment of the interactions are severely constrained.

Providing the satisfaction inherent in interacting with a real character is essential for many service providers. For instance, fans of entertainment characters may enjoy interacting with the entertainment characters at live performances, personal appearances, correspondence (e.g. fan mail), and so forth. Accordingly, in an effort to make user interactions with machine-based systems more "human," some service providers implement Artificial Intelligence (AI) systems. In general, AI systems attempt to mimic the intelligence of a character that senses, thinks, and responds to individual users in a more lifelike fashion than a menu-based system. AI systems typically execute on high performance computers and include speech recognition, speech synthesis, and/or other advanced algorithms in conjunction with extensive knowledge bases. For instance, the actions of some dolls are controlled wirelessly through a server that implements Watson™ (provided by International Business Machines Corporation (IBM)).

While AI systems may improve the emotional quality of user interactions, AI systems are usually limited to question and answer formats regarding a specific narrow and deep database of domain knowledge (e.g., medicine, law, etc.). The AI system receives a query, searches the database of domain knowledge in an attempt to identify an appropriate answer, and then articulates the answer. Accordingly, AI systems react to user queries with an answer even in situations in which a "real" character would respond proactively with questions and/or observations.

As the above example illustrates, as a general matter, AI systems do not reproduce the informal give-and-take of conversations and relationships between individual characters that are familiar with each other, have shared experiences, and/or friendships that grow over time. Consequently, service providers are often unable to automate interactions for services that rely on establishing and nurturing "real" relationships between users and characters.

As the foregoing illustrates, what is needed in the art are more effective techniques for realistically emulating character emotions and behavior via a machine-based system to generate enhanced character-based relationships for users.

SUMMARY OF THE INVENTION

One embodiment of the present invention sets forth a computer-implemented method for generating a character response during an interaction with a user. The method includes evaluating user input data that is associated with a user device to determine a user intent and an assessment domain; selecting at least one inference algorithm from multiple inference algorithms based on at least one of the user intent and the assessment domain, where the at least one inference algorithm implements machine learning functionality; computing a character response to the user input data based on the at least one inference algorithm, the user input data, a set of personality characteristics associated with a character, and data representing knowledge associated with the character; and causing the user device to output the character response to the user.

One advantage of the disclosed techniques is that the character responses to user inputs provide a convincing illusion that the user is interacting with a "real" character instead of a machine. In particular, unlike conventional question and answer based AI systems, the character response to a question can be another question. Further, by tailoring different character responses to different user devices, the character responses realistically emulate a continuous and consistent relationship that transcends the user devices.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
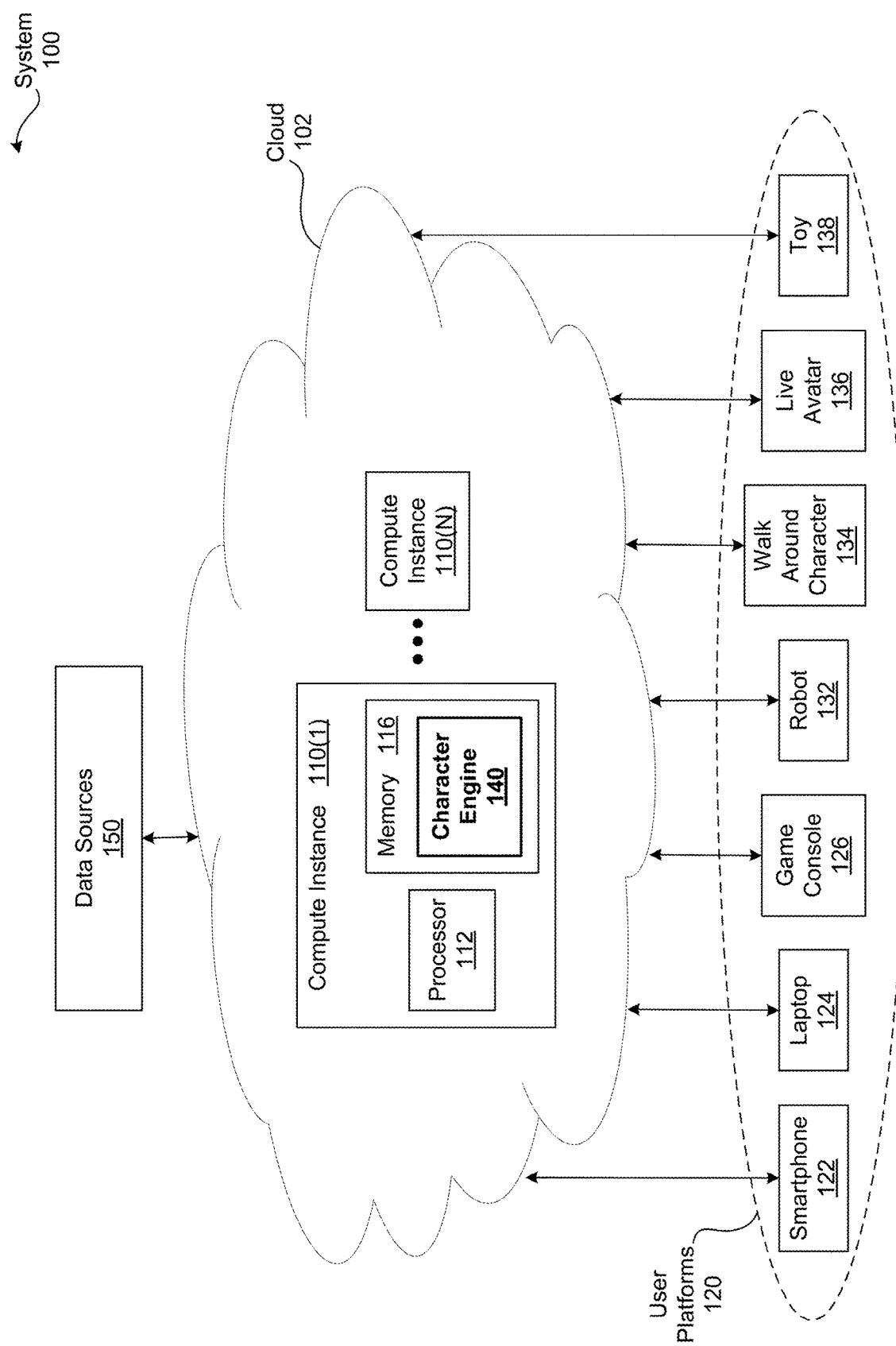
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a cloud (i.e., encapsulated shared resources, software, data, etc.) 102. The cloud 102 is connected to variety of user platforms 120 and data sources 150. In some embodiments, the user platforms 120 comprise user devices. For explanatory purposes, multiple instances of like objects are denoted with reference numbers identifying the object and parenthetical numbers identifying the instance where needed.

The cloud 102 includes, without limitation, any number and type of compute instances 110. Each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, or any suitable combination of the foregoing.

In general, the system 100 is configured to automate interactions between service providers and users via the user platforms 120. As is commonly recognized, providing the satisfaction inherent in interacting with a real character is essential for some service providers. As referred to herein, a "character" may be any entity that is associated with an individualizing personality. A character may be a live person, a historical person, a fictitious superhero, an animal, and so forth. For instance, fans of entertainment characters may enjoy interacting with the entertainment characters at live performances, personal appearances, correspondence (e.g., fan mail), and so forth.

For this reason, many conventional automated interaction systems implement AI systems that attempt to mimic the intelligence of a character. However, these types of AI systems are typically limited to specific formats and/or domains. For instance, many AI systems are limited to question and answer formats and a specific narrow and deep database of domain knowledge (e.g., medicine, law, etc.). The AI system receives a query, searches the database of domain knowledge in an attempt to identify an appropriate answer, and then articulates the answer.

However, because of the limited interaction paradigm, the AI system does not typically reproduce the informal give-and-take commonly associated with interactions between individual characters. Other conventional AI systems exhibit similar limitations that prevent the AI systems from providing a emotionally satisfying illusion that users are interacting with a "real" character instead of a machine.

Realistically Modeling a Character

To provide a convincing illusion that users are interacting with a "real" character, the memory 118 includes, without limitation, the character engine 140. In operation the character engine 140 combines sensing algorithms, advanced thinking and learning algorithms, and expressing algorithms in a flexible and adaptive manner. Upon receiving data via the user platform 120, the character engine 140 determines a current context that includes a user intent and an assessment domain. To generate character responses, the character engine 140 selects and applies inference algorithm(s) and personality engine(s) based on the current context and data received from the data sources 150. Finally, the character engine 140 tailors the character responses to the capabilities of the user platform 120.

As shown, the user platforms 120 include, without limitation, the smartphone 122, the laptop 124, the game console 126, the robot 132, the walk around character 134, the live avatar 136, and the toy 138. In alternate embodiments, the user platforms 120 may include any number and type of platforms that may express character responses in any technically feasible fashion (e.g., text, gesture, action, sound, etc.). The data sources 150 may include any type of devices and may transmit data to the character engine 140 in any technically feasible fashion. For example, the data sources 150 could include any combination of a gamification platform, a World Wide Web, a movie script, a book, a user-specific history, and the like. As referred to herein, a gamification platform includes any combination of software and hardware that implement game mechanics to entice the user to provide input that can be used to model the character.

It will be appreciated that the system 100 shown herein is illustrative and that variations and modifications are possible. In alternate embodiments, the system 100 may include any distributed computer system instead of the cloud 102. In other embodiments, the system 100 does not include the cloud 102 and, instead, the system 100 includes a single computing unit that implements multiple processing units (e.g., central processing units and/or graphical processing units in any combination). In yet other alternate embodiments, the connection topology between the various units in FIG. 1 may be modified as desired. For instance, in some alternate embodiments, the data sources 150 may be included in the cloud 102.

In alternate embodiments, the system memory 116 may not include the character engine 140. Instead, the character engine 140 may be provided as an application program (or programs) stored on computer readable media such as a CD-ROM, DVD-ROM, flash memory module, or other tangible storage media. In various embodiments, the functionality of the character engine 140 may be integrated into or distributed across any number (including one) of software applications.

Note that the techniques described herein are illustrative rather than restrictive, and may be altered without departing from the broader spirit and scope of the invention. Many modifications and variations on the functionality provided by the character engine 140 will be apparent to those of ordinary skill in the art without departing from the scope and spirit of the described embodiments. For instance, in various embodiments, any number of the techniques may be implemented while other techniques may be omitted in any technically feasible fashion that generates character responses based on combining sensing, thinking and learning, and expressing algorithms.

Figure 2:
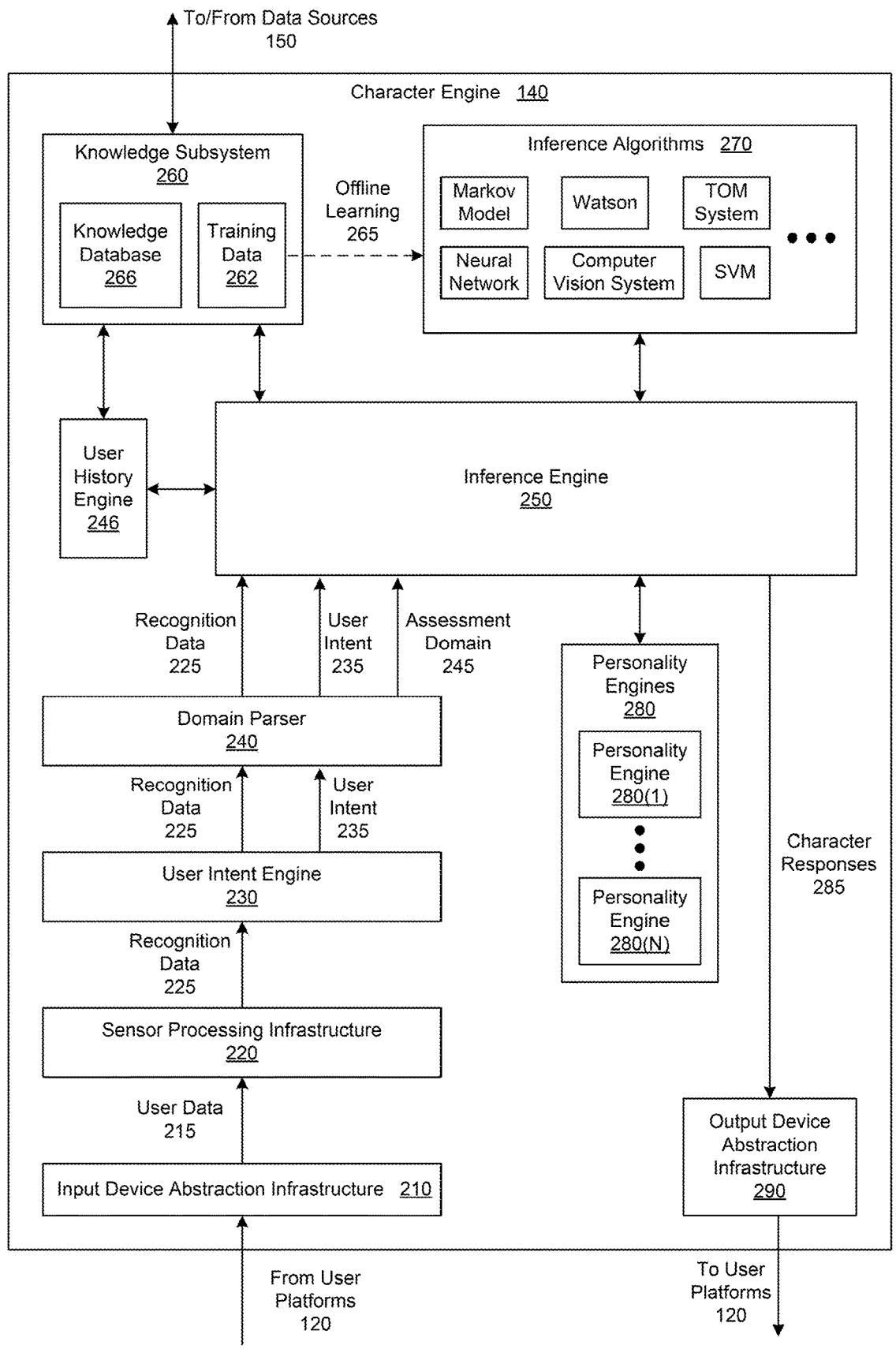
FIG. 2 is a more detailed illustration of the character engine of FIG. 1, according to various embodiments of the present invention.

FIG. 2 is a more detailed illustration of the character engine 140 of FIG. 1, according to various embodiments of the present invention. As shown, the character engine 140 includes, without limitation, an input platform abstraction infrastructure 210, a sensor processing infrastructure 220, a user intent engine 230, a domain parser 240, an inference engine 250, any number of inference algorithms 270, any number of personality engines 280, an output platform abstraction infrastructure 290, and a knowledge subsystem 260.

In operation, the input platform abstraction infrastructure 210 receives input data from any number and types of the user platforms 120. For instance, in some embodiments, the input platform abstraction infrastructure 210 may receive text, voice, accelerometer, and video data from the smartphone 122. In other embodiments, the input platform abstraction infrastructure 210 may receive discrete button, voice, and motion data from the robot 132 and/or the toy 138. In yet other embodiments, the input platform abstraction infrastructure 210 may receive control inputs from the game console 126 or a smart television; audio from a telephone or kiosk microphone; and/or voice and imagery from augmented and virtual Reality (AR/VR) systems.

The input platform abstraction infrastructure 210 includes, without limitation, middleware (not shown). The middleware performs any number and combination of formatting, standardizing, error correcting, and bandwidth limiting operations on the input data to generate the user data 215. Subsequently, the input platform abstraction infrastructure 210 transmits the user data 215 to the sensor processing infrastructure 220.

The user data 215 may include any number and type of data. For example, the user data 215 could include text, audio, imagery (both still and video), Inertial Measurement Unit (IMU) data, positioning data (e.g., Global Positioning System data). The user data 215 could further include Radio Frequency data, such as Radio-Frequency Identification data and received Signal Strength data, parsed phonemes, and data received from other sensor primitives.

In alternate embodiments, any portion, including all, of the functionality of the middleware may be implemented in one or more of the user platforms 120 instead of the input platform abstraction infrastructure 210. In such embodiments, the character engine 120 may or may not include the input platform abstraction infrastructure 210.

The sensor processing infrastructure 220 converts the user data 215 into recognition data 225. The sensor processing infrastructure 220 may be configured to generate the recognition data 225 in any number of machine understandable formats that are compatible with the inference engine 250.

For instance, in some embodiments, the recognition data 225 may include speech recognition data, semantic understanding (e.g., Natural Language) data, face recognition data, facial expression recognition data, gesture recognition data, physical object recognition data, and the like. The sensor processing infrastructure 220 transmits the recognition data 225 to the user intent engine 230.

The user intent engine 230 performs analysis operations on the recognition data 255 to generate a user intent 235. In some embodiments, the user intent engine 230 may include any number and type of analysis algorithms in a modular fashion. Further, each of the analysis algorithms may be tailored to analyze specific types of the recognition data 225 in an attempt to identify specific features.

For instance, in some embodiments, the user intent engine 230 may include a speech analysis algorithm that examines the speech prosody of speech included in the recognition data 225 to detect any upward inflections at the end of sentences. If the speech analysis algorithm detects an upward inflection at the end of a sentence, then the speech analysis algorithm determines that the user intent 235 is "asking a question." In other embodiments, the user intent engine 230 may include a gesture analysis algorithm that analyzes the recognition data 225 to determine whether the user intent 235 is "looking for emotional support."

Subsequently, the user intent engine 230 transmits the recognition data 225 and the user intent 235 to the domain parser 240. The domain parser 240 performs analysis operations on the recognition data 225 to determine an assessment domain 245. In some embodiments, the domain parser 240 may perform additional analysis operations to refine the user internet 235 based on the assessment domain 245 and/or the recognition data 225. For example, the domain parser 240 could refine the user intent 235 from "asking a question" to "asking a question about sports."

The domain parser 240 may determine the assessment domain 245 based on any mode of interaction, at any level of granularity, and in any technically feasible fashion. For instance, in some embodiments, the domain parser 240 may first determine the mode of interaction (e.g., whether speech is to be understood, images are to be recognized, text is to be understood, and/or gestures are to be recognized). The domain parser 240 may then analyze the content of the recognition data 225 to determine the assessment domain 245 for the mode of interaction. For example, if speech is to be understood, then the domain parser 240 could perform analysis operations on the recognition data 225 to determine whether the assessment domain 245 is "causal conversation," "storytelling," or "homework," to name a few.

Together, the user intent 235 and the assessment domain 245 provide a current context for the interaction with the user. Notably, the user intent 235, the mode(s) of interaction, and/or the assessment domain 245 may change as time passes. For example, at one particular time, the user intent engine 230 and the domain parser 240 could determine that the user intent 235 is "asking a question" and the assessment domain 245 is "sports." At a subsequent time, the user intent engine 230 and the domain parser 240 could determine that the the user intent 235 is "asking a question" and the assessment domain 245 is "cooking."

In some embodiments, the domain parser 245 includes a single generalized content algorithm. In other embodiments, the domain parser 245 includes multiple specialized analytic processors (not shown) that act upon streaming input data (e.g., the recognition data 225 and/or the user intent 235) in real time. Each of the analytic processors acts as a "tuned resonator" that searches for specific features that map to a particular context. For instance, suppose that the character engine 120 represents a helper droid that is interacting with a user. The domain parser 245 could execute any number of specialized analytic algorithms that search for features unique to the current context of the interaction between the helper droid and the user.

Some examples of contexts include:
The user is seeking homework help from the character.
The user is offering to help the character to solve a problem in the character's world.
The user is participating in a multiplayer experience with the character.
The user wants the character to tell a story.
The user wants to share a story with the character.
The user is telling a joke and wants the character's reaction.

The domain parser 245 transmits the recognition data 225, the user intent 235, and the assessment domain 245 to the inference engine 250. The inference engine 250 then establishes a current context based on the user intent 235 and the assessment domain 245. The inference engine 250 may also refine the current context, the user intent 235, and/or the assessment domain 245 in any technically feasible fashion and based on any data. For example, the inference engine 250 may derive a current context from the assessment domain 245 and the user intent 235 and then perform additional assessment operations on the recognition data 225 to refine the current context.

In alternate embodiments, the domain parser 245 may include multiple modules (not shown) that act as "matched filters" that are highly sensitive to a single context and interact directly with the inference engine 250 via an Application Programming Interface (API). Each of the matched filters may include feature vector analyzers, regression analyzers, neural networks, genetic algorithms, analytic geometry analyzers, or any other technically feasible feature detectors.

In such embodiments, the inference engine 250 may generate and/or refine the current context, including the assessment domain 245 and user intent 235, based on the data received from the matched filters. The inference engine 250 may generate and/or refine the current context in any technically feasible fashion. For instance, in some embodiments, the API may enable each of the matched filters to provide a confidence factor. The inference engine 250 may weigh the inputs received from the different matched filters based on the corresponding confidence factors to determine the current context. Notably, the inference engine 250 may be stateful (e.g., learning and adapting the weighting based on interactions with individual users or collections of users), or stateless (e.g., implementing a fixed voting scheme).

The inference engine 250 evaluates the assessment domain 245, the user intent 235, and/or the recognition data 225 in conjunction with data obtained from the data sources 150 to determine character responses 285. In general, the character responses 285 specify both actions that the character performs and how to express the actions via the user platform 120. Although not shown, the inference engine 250 includes, without limitation, an executive shell application, a scheduler application, and a resolver application.

In operation, the executive shell application selects one or more of the inference algorithms 270 based on the assessment domain 245 and/or the user intent 235. As shown, the inference algorithms 270 include, without limitation, a Markov model, Watson™, a theory of mind (TOM) system, a neural network, a computer vision system, and a support vector machine. In alternate embodiments, the inference algorithms 270 may include any number and type of algorithms, machine learning techniques, and the like. Advantageously, the inference engine 250 may implement an API and/or abstraction layer that provides a standardized interface between the inference engine 250 and the inference algorithms 270.

Subsequently, the scheduler application applies the selected inference algorithms 270 to the recognition data 225 to generate inferences. As referred to herein, an "inference," may be any type of conclusion, action, state, and so forth, that the inference engine 250 generates. As part of applying the selected inference algorithms 270, the inference engine 250 may interface with the knowledge subsystem 260 to obtain data from the data sources 150 and/or a knowledge database 266 that is included in the the knowledge subsystem 260. The resolver application resolves any discrepancies in the inferences obtained from the selected inference algorithms 270. The resolver application may resolve discrepancies in any technically feasible fashion. For example, in some embodiments, the resolver application may implement voting and weighing functionality.

The executive shell application may then select additional inference algorithms 270 based on the current inferences, the recognition data 225, the assessment domain 245, and/or the user intent 235. Subsequently, the scheduler application may apply the additional inference algorithms 270 and the resolver application may resolve any discrepancies. The discrepancies may include discrepancies between any number of the inferences generated by the currently selected inference algorithms 270 and the inferences generated by the previously selected inference algorithms 270. The inference engine 150 may continue to generate inferences based on the inference algorithms 270 until the inference engine 150 has finished generating and resolving inferences.

For example, suppose that the user intent 235 is "requesting a reaction to a displayed object" and the assessment domain 245 is "holding an object in front of a camera." The executive shell application could select a computer vision model and a convolutional multi-layer neural net included in the inference algorithms 270 to process the recognition data 225 received via the camera. The scheduler application could, independently and substantially in parallel, transmit the recognition data 225 received via the camera to the selected inference algorithms 270 (e.g., the CV model and the convolutional multi-layer neural net).

After receiving inferences from each of the selected inferences algorithms 270, the resolver application could weigh the inferences based on confidence factors and/or past performance metrics to generate a "consolidated" inference that classifies the object. The inference engine 150 could then apply additional inference algorithms 270 to the consolidated inference that classifies the object to generate an inference that reflects an appropriate action, such as "complement the user on their excellent taste." The inference engine 150 could also tailor the inference based on the user platform 120. For example, if the user platform 120 is the robot 132, then the inference engine could generate an additional inference, such as "move robot's arm towards the object."

Because the inference engine 250 selects and applies the inference algorithms 270 that are optimized with respect to the current context of the interaction, the inference engine 250 may generates realistic inferences for a wide range of interactions via the user platforms 120. Notably, advanced inference algorithms 270 TOM systems, etc.) enable the inference engine 250 to take initiative and proactively engage with users. Accordingly, the interaction paradigms implemented in the inference engine 250 are substantially more sophisticated than the question and answer interaction paradigms implemented in many conventional AI systems (e.g., the perception of sympathy, empathy, emotion, etc.). Further, because the number and type of inference algorithms 270 may be modified as time passes, the inference engine 250 may be adapted to exploit advances in technology.

In some embodiments, the inference engine 250 may apply a TOM system included in the inference algorithm 270 to generate hypotheses about the future intents and actions of the user. In general, a TOM system synthesizes hypotheses about future intents and actions of a user, along with attributions of behaviors (e.g., "the user exhibited behavior X due to motivation Y"). In one embodiment, the TOM system could include a set of matched filter "tuned resonators" to determine a future user intent. As persons skilled in the art will recognize, the user intent engine 230 and the TOM system could include similar or identical algorithms. However, while both the user intent engine 230 and the TOM system may perform passive analysis operations, the TOM system may perform additional active synthesis operations.

For example, suppose that a computer vision system included in the inference algorithms 270 analyzed the recognition data 225 that included images of a face of the user. Further, suppose that the computer vision system generated an inference that indicated that a facial expression corresponded to uncertainty. The executive shell application and the scheduler application could configure the TOM system to infer the reason for the uncertainty. In response, the TOM system could generate one inference that the user is confused about the meaning of a response from the character and another inference that the user is indecisive about what action to perform next. The resolver application could then evaluate each of the inferences, generate a merit rating for each of the inferences, and select the inference with the highest merit rating as the consolidated inference regarding the reason for the uncertainty.

After the inference engine 250 finishes generating inferences, the inference engine 250 selects one or more of the personality engines 280. The inference engine 250 selects the personality engines 280 based on any combination of the inference(s), the recognition data 255, the user intent 235, and/or the assessment domain 245. Subsequently, the inference engine 250 applies the personality engines 280 to the inference(s) and/or the recognition data 255 to determine the character responses 285.

The inference engine 250 may select, apply, and combine any number of the personality engines 280 in any technically feasible fashion. For example, the inference engine 250 could include voting and weighting functionality to determine the character responses 285 based on multiple personality engines 280. By sagaciously selecting, applying, and combining the personality engines 280, the inference engine 250 generates the character responses 285 that realistically express a particular character or a current emotional state of a particular character.

In alternate embodiments, the inference engine 250 may select and apply the personality engines 280 repeatedly, to any amount and type of data, and in any technically feasible fashion. In some embodiments, the inference engine 250 may apply the personality engines 280 to an inference to determine a content of an action. Subsequently, the inference engine 250 may apply the personality engines 280 to the content of the action to determine how to express the action. In this fashion, the inference engine 250 may generate the character response 285 that includes content and expression.

For example, suppose that the character engine 250 models a chatbot (i.e., an AI-based chat application), and the inference engine 250 generates an inference based on the inference algorithms 270. The inference engine 250 could then select the personality engine 280(2) and apply the personality engine 280(2) to the inference to determine a content of a verbal response that is consistent with the personality engine 280(2). The inference engine 250 could then select and apply the personality engine 280(3) to the content of the verbal response to determine a modulation for the verbal response (e.g., whether to deliver the verbal response in an aggressive or a conciliatory manner).

In another example, if the user platform 120 is capable of displaying facial expressions, then the inference engine 250 could select and apply the personality engine 280(3) to modify and modulate facial expressions. More specifically, if the personality engine 280(3) represents an angry, hostile character, then the personality engine 280(3) could generate the character response 285 that causes the user platform 120 to display an angry expression. By contrast, if the personality engine 280(3) represents an agreeable, likable character, then the personality engine 280(3) could generate the character responses 285 that cause the user platform 120 to display a smile and nod.

As persons skilled in the art will recognize, the personality engines 280 are usually configured to transmit and receive similar types of messages that are associated with a uniform set of behaviors. For example, irrespective of the structures and/or algorithms implemented in the individual personality engines 280, the personality engines 280 generate character responses 285 that involve any number of speaking/texting, gesturing, moving, forming facial expressions, and making decisions. Accordingly, in some embodiments, the inference engine 250 may include an API and/or abstraction layer that provides a standardized interface between the inference engine 250 and the personality engines 280.

As shown, after the inference engine 250 generates the character responses 285, the inference engine 250 transmits the character responses 285 to the output platform abstraction infrastructure 290. The output platform abstraction infrastructure configures the user platform 120 to convey the character responses 285 in a manner that is consistent with the expression capabilities of the user platform 120.

For example, if the user platform 120 displays the character as a computer graphics avatar, then a renderer (not shown) included in the output platform abstraction infrastructure 290 could configure a computer graphics engine to create and display an image that conveyed the character responses 285. The computer graphics engine could be implemented in the any technically feasible device, such as the user platform 120, one of the compute instances 110 included in the cloud 102, etc.

Advantageously, the output platform abstraction infrastructure 290 supports any number of expression methods that are compatible with the user platform 120. For instance, the output platform abstraction infrastructure 290 may configure the robot 132 to express text, voice, movement, gestures, facial expressions, and so forth. Furthermore, the output platform abstraction infrastructure 290 enables the character engine 140 to interact with users in a consistent fashion across various different instantiations of the character implemented via any number of the user platforms 120.

Further, the output platform abstraction infrastructure 290 may be configured to optimize the expression of the character responses 285 based on the user platform 120. For example, if the character response 285 involves rendering computer graphics avatar during a teleconference, the output platform abstraction infrastructure 290 may tailor the resolution of the avatar based on the graphical processing power associated with the user platform 120.

As shown, the inference engine 250 interfaces with the knowledge subsystem 260 in multiple modes. In a real-time mode (I.e., while interacting with the user), the inference engine 250 may interface with the knowledge subsystem 260 as part of determining the inferences and/or the character responses 285. For example, the inference engine 250 may interact with the knowledge subsystem 260 to answer questions that the user asks regarding news, events, movie openings, sports scores, and the like. More specifically, the inference engine 250 may obtain data from the data sources 150 via the knowledge subsystem 260 and/or obtain data from the knowledge database 266 that is included in the the knowledge subsystem 260. In alternate embodiments, the inference engine 250 may obtain data directly from any number of the data sources 150.

The knowledge subsystem 260 may interface with any number and type of the data sources 150. For example, the knowledge subsystem 260 may receive data from the World Wide Web, a movie script, a book, and so forth. The knowledge subsystem 260 may store any type of data that is relevant to the character in the knowledge database 266. For example, the knowledge subsystem 260 could store targeted domain knowledge (e.g., a movie script that includes the character) as well as general knowledge (e.g., a weather feed) in the knowledge database 266.

The inference engine 250 and/or the knowledge subsystem 260 may process the data received from the data sources 150 in any technically feasible fashion. For example, some of the data sources 150 provide structured data (e.g., weather feeds), while other data sources 150 provide unstructured data (e.g., movie scripts). Notably, in some embodiments, the inference engine 250 and/or the knowledge subsystem 260 may receive data via crowdsourcing. For example, the inference engine 250 and/or the knowledge subsystem 260 could receive data from a gamification platform that engages large numbers of users to manually perform entity extraction and relationship mark-up among named entities. The structured data received by the inference engine 250 and/or the knowledge subsystem 260 could then be included in the training data 262 and used to train any number of the inference algorithms 270.

In various embodiments, the inference engine 250 may apply one or more of the inference algorithms 270 to extract structured data from unstructured data. For example, the inference engine 250 could select a Markov model to perform named entity extraction operations on the unstructured data. Subsequently, the inference engine 250 could configure a semantic ontology algorithm to establish relationship classes among the named entities. Finally, the inference engine 250 could format the relationship classes in an open API (e.g., Resource Description Framework, Web Ontology Language, etc.).

In addition, the inference engine 250 may transmit data associated with the current interaction to the knowledge subsystem 260 for storage in the knowledge database 266. For instance, in some embodiments, the inference engine 250 may transmit any combination of the recognition data 225, the user intent 235, the assessment domain 245, the inferences, and the character responses 285 to the knowledge subsystem 260.

In various embodiments and subject to permissions provided by the user, the local history engine 246 may interface with the inference engine 250 and/or the knowledge subsystem 260 to exchange data associated with the user. For instance, in some embodiments, the inference engine 250 may transmit any combination of the recognition data 225, the user intent 235, the assessment domain 245, the inferences, and the character responses 285 to the local history engine 246. Subsequently, the local history engine 246 may analyze the current interaction data in combination with historical data associated with the user and transmit consolidated data associated with the user to the knowledge subsystem 260.

In some embodiments, the local history engine 246, the inference engine 250, and/or the knowledge subsystem 246 may obtain additional data regarding individual users from the data sources 150. For instance, in various embodiments, the knowledge subsystem 246 may obtain data regarding individual users from data sources 150 that track customer demographics, purchase history, location history, social media activity, digital and/or physical activity history (e.g., watching a video or riding a theme park attraction), and the like.

While in the real-time mode, the inference engine 250 selects the data sources 150 based on any combination of the user intent 225, the assessment domain 245, theory of mind (TOM) inferences regarding future user intents, the identity of the character, and the identity of the user. As referred to herein, the identity of the character includes, without limitation, the "world" that the character inhabits, the character as perceived by the user (e.g., what movies the user has viewed that include the character), and the role of the character with respect to the user, to name a few.

For example, the inference engine 250 corresponding to a character from a movie could generate inferences and the character responses 285 based on recent comments about the movie on social media websites in addition to character experiences included in the movie script. Further, the inference engine 250 could answer questions regarding the weather in a city corresponding to a location of the user, news events relevant to the user, the current topic of conversation, and/or the current or previous interactions between the user and the character.

In various embodiments, the character engine 140 personalizes the character responses 285 based on interaction information that includes previous interactions between each user and any manifestation of the "character" implemented by the character engine 140. Such manifestations may include movies, actors portraying characters, and any number of character engines 140 that implement any number of different characters, to name a few. The character engine 140 may then generate the character responses 285 based on the interaction information. For example, the character engine 140 could generate the character response 285 based on interaction information that specifies whether the user has viewed the latest movie that includes a particular character.

In a batch mode that may occur when the character is not interacting with the user, the knowledge subsystem 260 continues to expand the knowledge database 266 and the user history engine 244. Further the knowledge subsystem 260 may expand training data 262 and, as part of an offline learning 265, transmit the training data 262 to offline components of the inference algorithms 270. Accordingly, the character engine 140 may develop a relationship with an individual user that evolves over time irrespective of whether the character engine 140 is interacting with the individual user.

For example, if the user platform 120 implements a chat application, then the inference engine 250 could transmit data associated with each new conversation to the knowledge subsystem 260. The data could include state variables such as user specific information, the user intent 235, the assessment domain 245, events that occur during the conversations, inferences and character responses 285 generated by the inference engine 150, and so forth. The knowledge subsystem 260 could evaluate the data, include relevant data in the knowledge database 266, and include data that is suitable for machine learning in the training data 262.

Subsequently, as part of the offline learning 265, one or more of the inference algorithms 270 could learn based on the new training data 262. For example, a Markov model that is implemented in a chat application could change the probability weightings of different edges in a chain based on the new training data 262. Consequently, the accuracy of the inference engine 250 would improve.

In another example, suppose that the user holds a rock in front of a camera for identification, the inference engine 250 incorrectly identifies the rock as a brick, and the user then states that the object is actually a rock. As part of the offline learning 265, a convolution neural network used for the image recognition could be updated with the new training data 262 that includes the correct identification of the rock. Consequently, the image identification accuracy of the convolution neural network would improve.

In various embodiments, a training assistance engine (not shown) provides at least a portion of the training data 262. The training assistance engine executes real-time Turk operations. As referred to herein, "Turk operations" are operations that influence machine-based operations based on human intelligence. In general, the training assistance engine enables users to participate in activities that generate new training data 262 In some embodiments, the training assistance engine generates the training data 262 that enables the initial training of the inference algorithms 270.

For example, the training assistance engine could include a Star Wars application that provides opportunities for the users to identify items in the Star Wars universe. In operation, the training assistance engine would transmit identification information received from the users to the knowledge subsystem 120, and the knowledge subsystem 120 would include the identification information in the training data 262. Consequently, during the offline learning 265, the inference algorithms 270 would learn based on the identification information received form the users via the Star Wars application. Advantageously, the training assistance engine may include any number of software applications (e.g., the Star Wars application) that allow users to pay for the privilege of influencing the development of an "official" character franchise.

In alternate embodiments, online components of the inference algorithms 270 may learn in real-time. The online components may learn based on the training data 262 or any other type of data received in any technically feasible fashion. For example, as the training engine performs Turk operations, the training engine could transmit data generated based on interactions with the users of the training engine to the online components. In this fashion, Turk/user interactions would continuously improve the performance of the inference algorithms 270 in real-time.

Figure 3:
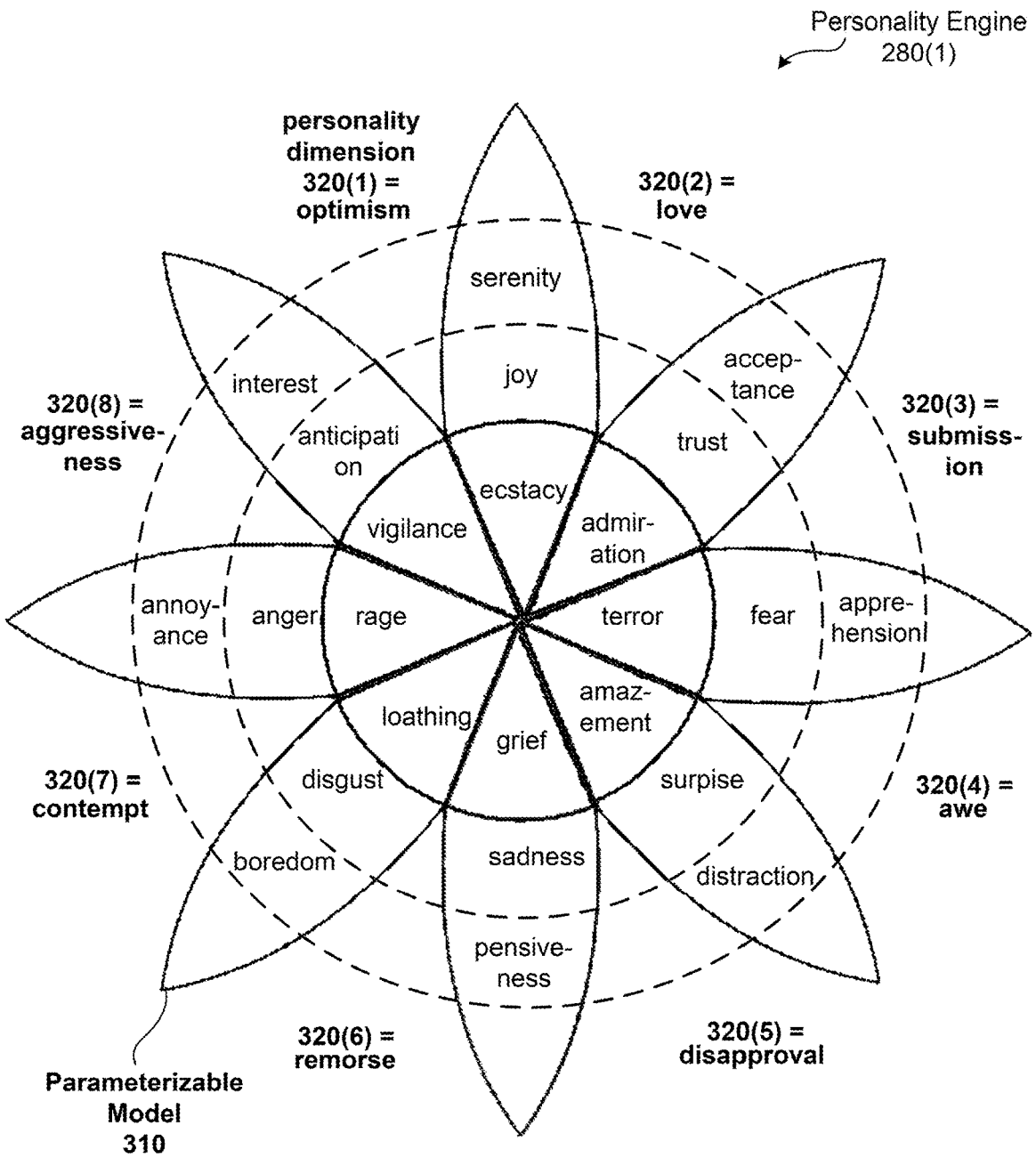
FIG. 3 illustrates an example of the personality engine of FIG. 2, according to various embodiments of the present invention.
Figure 3:
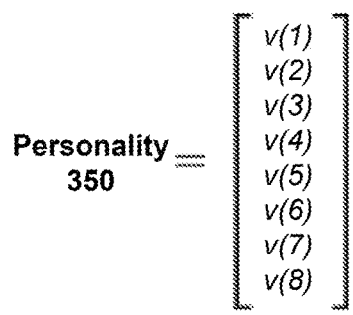

FIG. 3 illustrates an example of the personality engine 280(1) of FIG. 2, according to various embodiments of the present invention. In general, each of the personality engines 280 included in the character engine 140 is parametric instead of "hard wired." As referred to herein, a "parametric" personality engine 280 includes a parameterizable model 320 in addition to a set of parameters (e.g., coefficients, weights, etc) that match characteristics of a personality 350 that is associated with a particular character. By contrast, a "hard wired" personality engine includes a finite set of input conditions that are deterministically linked, via a rule base, to a finite set of outputs. Consequently, unlike hard wired personality engines, the personality engines 280 are not constrained to a finite set of inputs and outputs.

For example, one hard wired personality engine representing a chatbot could have a finite set of scripted responses based on a finite set of inputs. Another hard wired personality engine for the chatbot could include a finite set of classifiers that parse ambiguous inputs. By contrast, the personality engine 280 for the chatbot includes the parameterizable model 320, and is not constrained to a finite set of chat inputs and outputs.

The personality engine 280(1) is based on a "personality color wheel." As shown, the personality engine 280(1) includes, without limitation, the parameterizable model 320 and a multi-dimensional vector of scalars (e.g., coefficients, weights, etc.) that define the personality 350. The parameterizable model 320 includes eight personality dimensions 320: optimism, love, submission, awe, disapproval, remorse, contempt, and aggressiveness. Although not shown, the colors and shades vary across the parameterizable model 320. The personality 350 is defined by a multi-dimensional vector that includes eight vectors (v1-v8). Each vector corresponds to one of the personality dimensions 320 and includes any number of scalar values.

For example, the personality 350 associated with an evil, nasty cartoon character, could include relatively high scalar values for aggressiveness, contempt, and disapproval in addition to relatively low scalar values for love and optimism. By contrast, the personality 350 associated with a likable, mild-manner character could include relatively low scalar values for aggressiveness, contempt, and disapproval in addition to relatively high scalar values for love and optimism.

Automating Interactions Between Characters and Users

Figure 4:
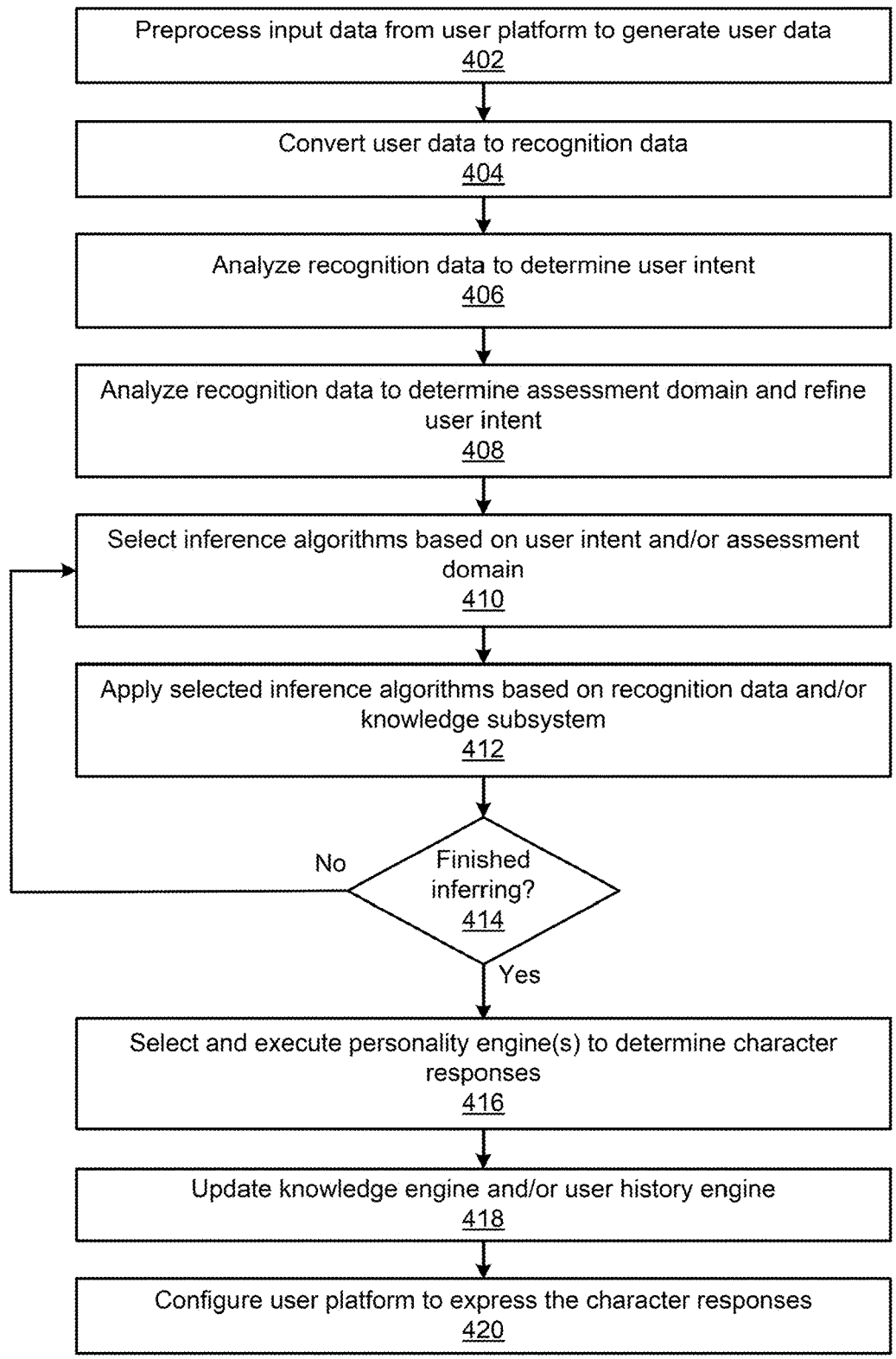
FIG. 4 is a flow diagram of method steps for modeling a character during an interaction with a user, according to various embodiments of the present invention.

FIG. 4 is a flow diagram of method steps for modeling a character during an interaction with a user, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the input platform abstraction infrastructure 210 receives and preprocesses input data from the user platform 120 to generate the user data 215. The input platform abstraction infrastructure 410 may perform any number and combination of formatting, standardizing, error correcting, and bandwidth limiting operations on the input data to generate the user data 215.

At step 404, the sensor processing infrastructure 220 converts the user data 215 into the recognition data 225. The sensor processing infrastructure 220 may be configured to generate the recognition data 225 in any number of machine understandable formats that are compatible with the inference engine 250. For example, the sensor processing engine 220 could convert audio user data 215 into speech recognition data, and image user data 215 into facial expression recognition data, gesture recognition data, and/or physical object recognition data.

At step 406, the user intent engine 230 analyzes the recognition data 225 to determine the user intent 235. For example, a speech analysis algorithm included in the user intent engine 230 could analyze the recognition data 225, identify an upward inflection at the end of a sentence, and determine that the user intent 235 is "asking a question" In another example, a gesture analysis algorithm included in the user intent engine 230 could analyze the recognition data 225 and determine the the user intent 235 is "looking for emotional support." The user intent engine 230 then transmits the recognition data 225 and the user intent 235 to the domain parser 240.

At step 408, the domain parser 240 analyzes the recognition data 225 to determine the assessment domain 245. The domain parser 240 may determine the assessment domain 245 at any level of granularity and any in any technically feasible fashion. For example, the domain parser 240 could analyze the content of the recognition data 225 to determine that the assessment domain 245 is "causal conversation," "storytelling," or "homework." In some embodiments, as part of determining the assessment domain 245, the domain parser 240 may refine the user intent 235. For example, the domain parser 240 may refine the user intent 235 from "asking a question," to "asking a question about sports." Together, the user intent 235 and the assessment domain 245 provide a current context for the interaction with the user. The domain parser 240 transmits the recognition data 225, the user intent 235, and the assessment domain 245 to the inference engine 250.

At step 410, the inference engine 250 selects one or more of the inference algorithms 270 based on the user intent 235 and/or the assessment domain 245. As a general matter, the inference engine 250 may select any number and combination of the inference algorithms 270. At step 412, the inference engine 250 applies the selected inferences algorithms 270 based on the recognition data 225 and/or the knowledge subsystem 260 to generate inferences. As referred to herein, the knowledge subsystem 260 includes, without limitation, the knowledge database 266 in addition to any data received at run-time from the data sources 150. The inference engine 250 may apply the selected inference algorithms 270 in any order and/or combine inferences obtained from different inference algorithms 270 in any technically feasible fashion.

At step 414, the inference engine 250 determines whether the inference engine 250 has finished generating inferences. If, at step 414, the inference engine 250 determines that the inference engine 250 has not finished generating inferences, then the method 400 returns to step 410, where the inference engine 250 selects and applies additional inference algorithms 270. The inference engine 250 may select the additional inference algorithms 270 based on current inferences, the user intent 235, and/or the assessment domain 245.

If, however, at step 414, the inference engine 250 determines that the inference engine 250 has finished generating inferences, then the method proceeds to step 416. At step 416, the inference engine 250 selects and executes any number of the personality engines 280 based on the inferences, the user intent 235, the assessment domain 245, and/or the user platform 295 to generate the character responses 285 to the user data 215. The inference engine 250 may select, apply, and combine any number of the personality engines 280 in any technically feasible fashion.

At step 418, the inference engine 250 updates the knowledge subsystem 260 and/or the user history database 246 to reflect the interaction with the user. The inference engine 250 may transmit any type of information in any technically feasible fashion. For example, if the interaction involves the user correcting a mistaken identification that the character engine 140 previously generated, then the inference engine 250 may transmit the correct identification to the knowledge subsystem 260. The knowledge subsystem 260 may then include the correct identification in the training data 262 that trains a computer vision algorithm included in the inference algorithms 270.

At step 420, the inference engine 250 transmits the character responses 285 to the output platform abstraction infrastructure 210. In response, the output platform abstraction infrastructure 210 configures the user platform 120 to express the character responses 285. Notably, the output platform abstraction infrastructure 210 may perform any number of operations to adapt the character responses 285 to optimize the capabilities of the user platform 120. The method 400 then terminates.

Evolving a Character Over Time

Figure 5:
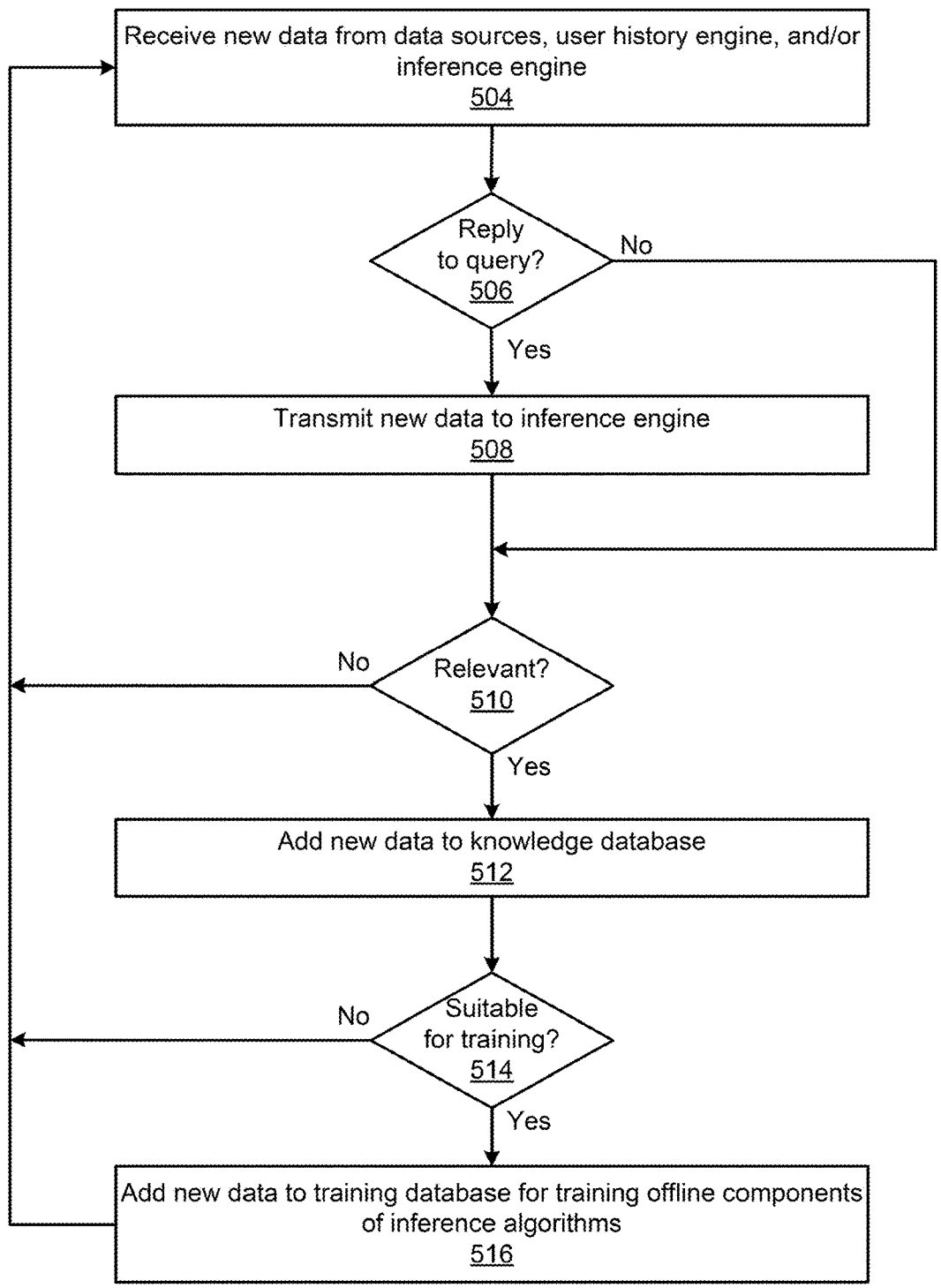
FIG. 5 is a flow diagram of method steps for incorporating data into a model of a character, according to various embodiments of the present invention.

FIG. 5 is a flow diagram of method steps for incorporating data into a model of a character, according to various embodiments of the present invention. Although the method steps are described with reference to the systems of FIGS. 1-3, persons skilled in the art will understand that any system configured to implement the method steps, in any order, falls within the scope of the present invention. As persons skilled in the art will recognize, each of the method steps may be performed in a batch mode while the inference engine 250 is not interacting with users or a run-time mode while the inference engine 250 is interacting with users.

As shown, a method 500 begins at step 504, where the knowledge subsystem 260 receives new data from the data sources 150, the user history engine 246, and/or the inference engine 250. At step 506, the knowledge subsystem 260 determines whether the new data is a reply to a query from the inference engine 250. If, at step 506, the knowledge subsystem 260 determines that the new data is a reply to a query from the inference engine 250, then the method 500 proceeds to step 508. At step 508, the knowledge subsystem 260 transmits the new data to the inference engine 250. If, however, at step 506, the knowledge subsystem 260 determines that the new data is not a reply to a query from the inference engine 250, then the method 500 proceeds directly to step 510.

At step 510, the knowledge subsystem 260 determines whether the new data is relevant to the inference engine 250. If, at step 510, the knowledge subsystem 260 determines that the new data is not relevant to the inference engine 250, then the method 500 returns to step 504, where the knowledge subsystem 260 receives additional new data. If, however, at step 510, the knowledge subsystem 260 determines that the new data is relevant to the inference engine 250, then the method 500 proceeds to step 512.

At step 512, the knowledge subsystem 260 stores the new data in the knowledge database 266. At step 514, the knowledge subsystem 260 determines whether the new data is suitable for training one or more of the inference algorithms 270. If, at step 514, the knowledge subsystem 260 determines that the new data is not suitable for training one or more of the inference algorithms 270, then the method 500 returns to step 504, where the knowledge subsystem 260 receives additional new data.

If, however, at step 514, the knowledge subsystem 260 determines that the new data is suitable for training one or more of the inference algorithms 270, then the method 500 proceeds to step 516. At step 516, the knowledge subsystem adds the new data to the training data 262 for training offline components of one or more of the inference algorithms 270. The method 500 then returns to step 504, where the knowledge subsystem 260 receives additional new data. By continuously expanding the knowledge database 266 and improving the inference algorithms 270 via the offline learning 265, the knowledge subsystem 260 incrementally improves the quality of the character responses 285.

In sum, the disclosed techniques may be implemented to automate interactions with users. In general, a character engine provides modular sensing, thinking and learning, and expressing functionality. More specifically, an input platform abstraction infrastructure and a sensor processing engine implement sensing algorithms that process user data received from any number and type of user platforms (e.g., dolls, teleconferencing, avatar, etc.) to generate recognition data. A user intent engine, a domain parser, and an inference engine implement analysis and machine learning algorithms that generate inferences that are consistent with the current context (e.g., user intent, assessment domain, etc.). A personality engine and an output platform abstraction infrastructure implement algorithms that express character responses based on the inferences and tuned to the character and the particular user platform. Further, to evolve and refine the character, the character engine continuously updates a knowledge database, training data used to train the machine learning algorithms, and individual user histories based on interactions with users and external data sources.

Advantageously, by implementing the character engine to automate user interactions, service providers provide a convincing illusion that users are interacting with a "real" character instead of a machine. In particular, unlike conventional question and answer based AI systems, the character engine proactively engages with users. For example, the character engine can reply to a question with another question. Because the character engine is modular, the character engine may be configured to implement and select between a wide variety of algorithms that are applicable to different characters, contexts, and user platforms. Further, the algorithms implemented in the character engine may be updated as technology advances. By continuously updating the knowledge database, training data, and local history, the character engine develops a relationship with an individual user that evolves over time. In addition, since the character engine dynamically tailors the responses to different user platforms, the character engine generates the illusion of continuous and consistent relationships that transcend the user platforms.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a character response during an interaction with a user, the method comprising:
    evaluating user input data that is associated with a user device to identify a user intent and an assessment domain;
    selecting at least one inference algorithm from a plurality of inference algorithms based, at least in part, on the user intent and the assessment domain, wherein each inference algorithm included in the plurality of inference algorithms implements machine learning functionality;
    generating an inference based on the at least one inference algorithm;
    selecting a first set of personality characteristics and a second set of personality characteristics from a plurality of sets of personality characteristics based, at least in part, on the inference, wherein the first set of personality characteristics is selected for generating content of the character response and the second set of personality characteristics is selected for generating an expression of the content of the character response, wherein the first set of personality characteristics comprises a first plurality of parameters and the second set of personality characteristics comprises a second plurality of parameters that is different from the first plurality of parameters, each parameter being associated with a personality dimension;
    computing the character response to the user input data based on the at least one inference algorithm, the user input data, the first set of personality characteristics, the second set of personality characteristics, and data representing knowledge associated with a character; and
    causing the user device to output the character response to the user.

2. The computer-implemented method of claim 1, wherein the at least one inference algorithm comprises at least a first inference algorithm and a second inference algorithm.

3. The computer-implemented method of claim 1, wherein:
    generating the inference comprises generating the inference further based on the user input data and the data representing knowledge associated with the character;
    selecting the first set of personality characteristics comprises selecting the first set of personality characteristics further based on at least one of the user intent or the assessment domain; and
    computing the character response comprises computing the character response further based on the inference.

4. The computer-implemented method of claim 1, wherein the data representing knowledge associated with the character includes information obtained from at least one of a World Wide Web, a script, a book, or a user-specific history.

5. The computer-implemented method of claim 1, further comprising updating the data representing knowledge associated with the character based on at least one of the user input data or the character response.

6. The computer-implemented method of claim 1, further comprising, in a batch mode:
    generating training data based on at least one of the user input data, the character response, the data representing knowledge associated with the character, or one or more data sources; and
    performing one or more operations that train the at least one inference algorithm based on the training data.

7. The computer-implemented method of claim 6, wherein the one or more data sources include a gamification platform that includes at least one of software or hardware that implement game mechanics to entice the user to provide input that can be used to train the at least one inference algorithm.

8. The computer-implemented method of claim 1, wherein causing the user device to output the character response comprises generating at least one of a physical action, a sound, or an image.

9. The computer-implemented method of claim 1, wherein the user device comprises a robot, a walk around character, a toy, or a computing device.

10. The computer-implemented method of claim 1, wherein the at least one inference algorithm comprises a Markov model, a computer vision system, a theory of mind system, a neural network, or a support vector machine.

11. A character engine that executes on one or more processors, the character engine comprising:
    a user intent engine that, when executed by the one or more processors, evaluates user input data that is associated with a user device to determine a user intent;
    a domain engine that, when executed by the one or more processors, evaluates at least one of the user input data or the user intent to identify an assessment domain; and
    an inference engine that, when executed by the one or more processors:
    selects at least one inference algorithm from a plurality of inference algorithms based on the user intent and the assessment domain, wherein each inference algorithm included in the plurality of inference algorithms implements machine learning functionality;
    generates an inference based on the at least one inference algorithm;
    selects a first set of personality characteristics and a second set of personality characteristics from a plurality of sets of personality characteristics based, at least in part, on the inference, wherein the first set of personality characteristics is selected for generating content of a character response and the second set of personality characteristics is selected for generating an expression of the content of the character response, wherein the first set of personality characteristics comprises a first plurality of parameters and the second set of personality characteristics comprises a second plurality of parameters that is different from the first plurality of parameters, each parameter being associated with a personality dimension; and
    compute the character response to the user input data based on the at least one inference algorithm, the user input data, the first set of personality characteristics, the second set of personality characteristics, and data representing knowledge associated with a character; and
    an output device abstraction infrastructure that, when executed by the one or more processors, causes the user device to output the character response to a user.

12. The character engine of claim 11, wherein the at least one inference algorithm comprises at least a first inference algorithm and a second inference algorithm.

13. The character engine of claim 11, wherein:
generating the inference comprises generating the inference further based on the user input data and the data representing knowledge associated with the character;
selecting the first set of personality characteristics comprises selecting the first set of personality characteristics further based on at least one of the user intent or the assessment domain; and
computing the character response comprises computing the character response further based on the inference.

14. The character engine of claim 11, wherein the data representing knowledge associated with the character includes information obtained from at least one of a World Wide Web, a movie script, a book, or a user-specific history.

15. The character engine of claim 11, wherein causing the user device to output the character response comprises generating at least one of a physical action, a sound, or an image.

16. The character engine of claim 11, wherein the user device comprises a robot, a walk around character, a toy, or a computing device.

17. The character engine of claim 11, wherein the at least one inference algorithm comprises a Markov model, a computer vision system, a theory of mind system, a neural network, or a support vector machine.

18. One or more non-transitory computer-readable media including instructions that, when executed by one or more processors, cause the one or more processors to generate a character response during an interaction with a user by performing the steps of:
evaluating user input data that is associated with a user device to identify a user intent and an assessment domain;
selecting at least one inference algorithm from a plurality of inference algorithms based, at least in part, on the user intent and the assessment domain, wherein each inference algorithm included in the plurality of inference algorithms implements machine learning functionality;
causing the at least one inference algorithm to compute an inference based on the user input data and data representing knowledge associated with a character;
selecting a first set of personality characteristics and a second set of personality characteristics from a plurality of sets of personality characteristics based, at least in part, on the inference, wherein the first set of personality characteristics is selected for generating content of the character response and the second set of personality characteristics is selected for generating an expression of the content of the character response, wherein the first set of personality characteristics comprises a first plurality of parameters and the second set of personality characteristics comprises a second plurality of parameters that is different from the first plurality of parameters, each parameter being associated with a personality dimension; and
causing a personality engine associated with the character to compute the character response to the user input data based on the inference, the first set of personality characteristics, and the second set of personality characteristics.

19. The computer-implemented method of claim 1, wherein:
evaluating the user input data further comprises evaluating the user input data to identify a mode of user interaction comprising at least one of text, audio, imagery, or gestures; and
selecting the at least one inference algorithm further comprises selecting the at least one inference algorithm from the plurality of inference algorithms based on a capability of the at least one inference algorithm to process the mode of user interaction.

* * * * *